(12) United States Patent
Alrabady et al.

(10) Patent No.: US 9,031,237 B2
(45) Date of Patent: May 12, 2015

(54) METHOD AND APPARATUS FOR PROTECTING PRIVATE DATA ON A VEHICLE

(75) Inventors: Ansaf I. Alrabady, Livonia, MI (US); Fred W. Huntzicker, Ann Arbor, MI (US); David Racklyeft, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1540 days.

(21) Appl. No.: 12/388,736

(22) Filed: Feb. 19, 2009

(65) Prior Publication Data

US 2010/0211770 A1 Aug. 19, 2010

(51) Int. Cl.
| | |
|---|---|
| *G06F 12/14* | (2006.01) |
| *G06F 21/62* | (2013.01) |
| *G07C 5/08* | (2006.01) |
| *H04L 9/08* | (2006.01) |

(52) U.S. Cl.
CPC ........ *G06F 21/62* (2013.01); *G06F 2221/2143* (2013.01); *G07C 5/0858* (2013.01); *H04L 2209/84* (2013.01); *H04L 9/0894* (2013.01); *H04L 2209/80* (2013.01)

(58) Field of Classification Search
CPC ............ G06F 21/62; G06F 2221/2143; H04L 9/0894; H04L 2209/80; H04L 2209/84; G07C 5/0858
USPC ................. 713/150, 189, 224, 201, 218, 220; 711/159, 115, 103, E12.091, E12.092, 711/E12.002; 709/219; 380/227; 726/27
See application file for complete search history.

(56) References Cited

U.S. PATENT DOCUMENTS

| | | | |
|---|---|---|---|
| 2009/0216935 A1* | 8/2009 | Flick | 711/103 |
| 2009/0300312 A1* | 12/2009 | Handschuh et al. | 711/166 |
| 2010/0063670 A1* | 3/2010 | Brzezinski et al. | 701/33 |

* cited by examiner

*Primary Examiner* — Jeffrey Pwu
*Assistant Examiner* — Nega Woldemariam
(74) *Attorney, Agent, or Firm* — Ingrassia Fisher & Lorenz, P.C.

(57) ABSTRACT

Methods and apparatus are provided for protecting private data on a vehicle. The method comprises receiving a first signal generated by a user of the vehicle and, in response to the first signal, deleting predetermined data stored on the vehicle to prevent the private data from being accessed.

18 Claims, 2 Drawing Sheets

METHOD AND APPARATUS FOR PROTECTING PRIVATE DATA ON A VEHICLE

TECHNICAL FIELD

The present invention generally relates to the field of vehicular security, and more particularly relates to a method and apparatus for protecting private data on a vehicle.

BACKGROUND OF THE INVENTION

Modern vehicles can include electronic devices that store personal information. For example, a vehicle may be equipped with one or more systems that are configured to store addresses, phone numbers, financial information, and/or other personal information corresponding to the owner or a user of the vehicle. Due to the sensitive nature of this information, the owner or user may desire to prevent other parties having access to the vehicle from viewing this information. For example, the owner may not desire for maintenance personnel to have access to this information when the vehicle, or a component of the vehicle that stores personal information, is at a repair facility. Further, the owner may not desire a valet or other temporary occupant of the vehicle to access this personal information. Finally, an owner that sells the vehicle may desire to prevent the new owners for accessing the personal information.

Accordingly, it is desirable to provide a system for preventing unauthorized parties from accessing personal information stored on a vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment a system is provided for protecting private data that is stored on a vehicle. The system comprises a data interface configured to transmit data to, and retrieve data from, an external memory source and a processor coupled to the data interface. The processor is configured to receive a first signal generated by a user of the vehicle, transmit predetermined data stored on the vehicle to the external memory source, delete the predetermined data to prevent the private data from being accessed, receive a second signal generated by the user of the vehicle, and retrieve the predetermined data from the external memory source.

In another embodiment, a method is provided for protecting private data stored on a vehicle. The method comprises receiving a first signal generated by a user of the vehicle and, in response to the first signal, deleting predetermined data stored on the vehicle to prevent the private data from being accessed.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be understood that FIGS. 1-2 are merely illustrative and, particularly with respect to FIG. 1, may not be drawn to scale.

Embodiments protect private data that is accessed and/or stored on a vehicle in response to one or more user inputs. As described further below, the private data is protected by deleting predetermined data (e.g., the private data itself or a cryptographic key) from the vehicle. When the private data is protected it cannot be accessed on the vehicle.

As used herein the term "private data" may refer to any information stored on a vehicle that a user does not want an unauthorized party to access. Private data may include, personal or user specific information corresponding to the user that is stored in a Vehicular Communication System (VCS). For example, the private data may include the home and/or business address for the user and a contact list of individual names, addresses, and phone numbers. This information may be displayed on a user interface or accessed by the VCS to provide the user with navigational instructions for driving the vehicle to a desired location (e.g., a home or business listed in the contacts list). Private data may also include financial information, such as a bank account number or credit card number, corresponding to the user of the vehicle. The VCS may utilize this financial information to pay fees (e.g., toll fees) associated with the operation of the vehicle or to make other payments. In addition, private data may include various cryptographic keys or passphrases that are utilized to access a private network, such as a residential local area network (LAN) protected by an encryption scheme (e.g., WEP), or to establish a secure connection with a remote device.

Figure 1:
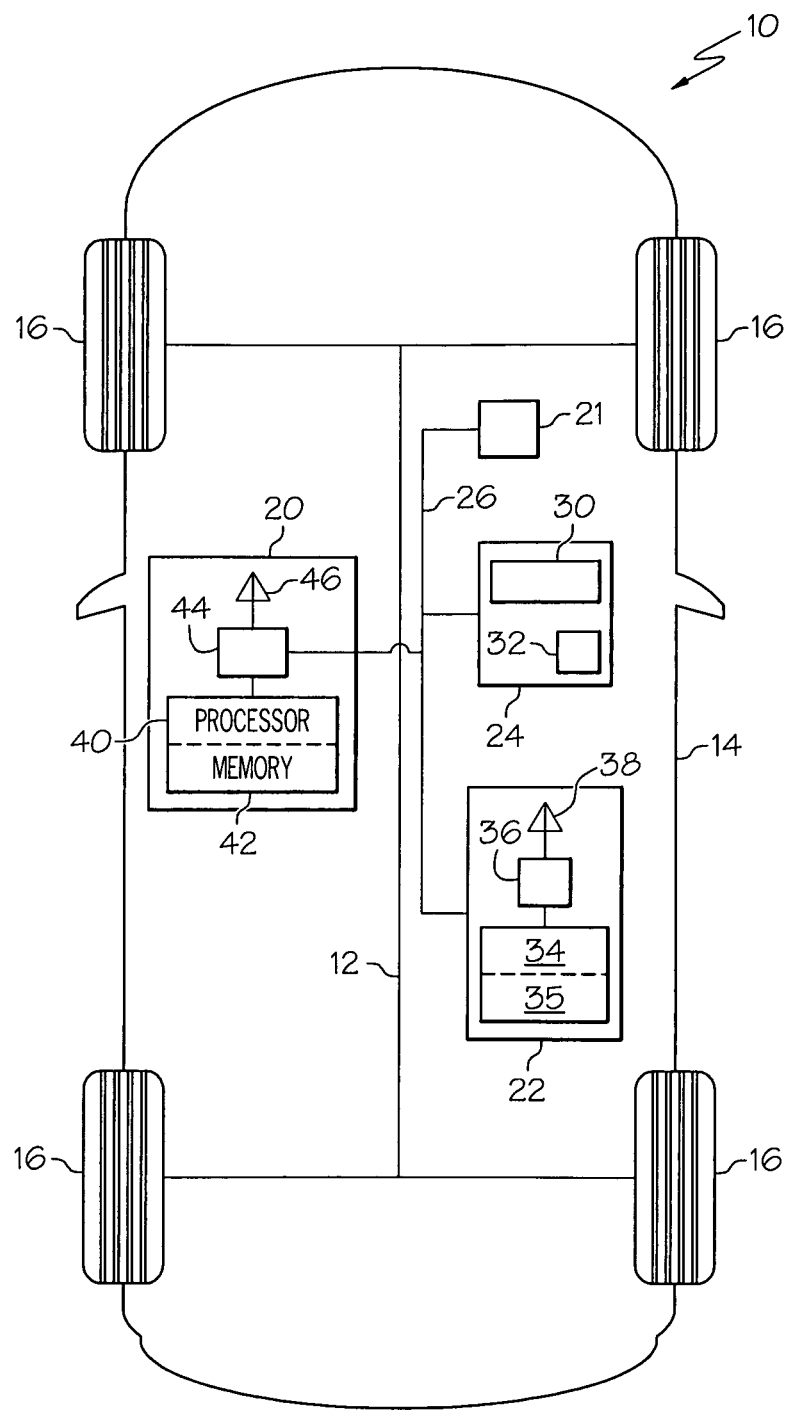
FIG. 1 is a block diagram of an exemplary vehicle configured for use with one embodiment.
Figure 2:
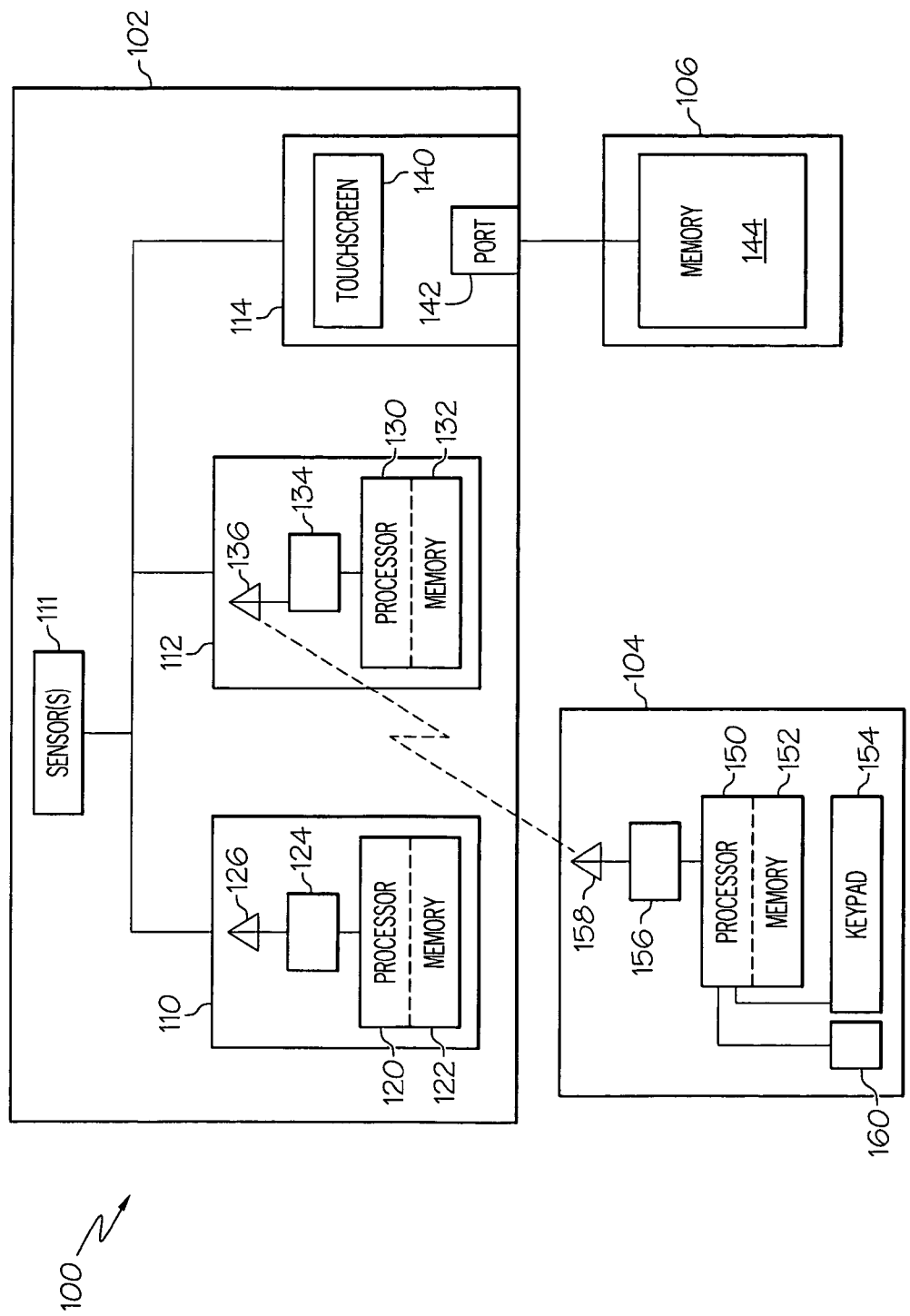
FIG. 2 is a block diagram of an exemplary system configured to protect private data stored on a vehicle.

FIG. 1 is a depiction of an exemplary vehicle 10 configured for use with one embodiment. The vehicle 10 includes a chassis 12, a body 14, and four wheels 16. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In addition, vehicle 10 includes a VCS 20, one or more sensors 21, a wireless data interface 22, and a user interface 24. As depicted, sensors 21, wireless data interface 22, and user interface 24 are coupled to VCS 20 via data communication link 26. In one embodiment data communication link 26 comprises an onboard data communication bus configured to transmit data, status and other information or signals between various components of vehicle 10. Onboard data communications bus 26 may comprise any suitable physical or logical means of connecting computer systems and components. This includes, but is not limited to, direct hard-wired connections, fiber optics, and infrared and wireless bus technologies. In addition, it should be noted that each of these components may be coupled to or formed integrally with one or more vehicle control units (e.g., an electronic control unit) that enables VCS 20, sensors 21, wireless data interface 22, and user interface 24 to communicate with one another.

Sensor(s) 21 may be configured to detect the presence of a vehicle key within, or proximate to, the vehicle ignition (not illustrated). As further described below, sensor(s) 21 may transmit a data protection signal to VCS 20 based on the position of the vehicle key with respect to the vehicle ignition or based on the position of the vehicle ignition itself. In addition, sensor(s) 21 may also be configured to transmit a data restore signal to VCS 20 based on position of the vehicle key with respect to the vehicle ignition or the position of the vehicle ignition. The data protection signal and data restore signal are described below with regard to VCS 20.

The user interface 24 transmits signals, including a data protection signal and a data restore signal, in response to one or more user inputs. In the depicted embodiment user interface 24 includes a touchscreen 30 and a port 32. Touchscreen 30 renders various graphic, iconic, and/or textual images within a display area. In addition, touchscreen 30 receives input from the user by detecting the presence and location of a user's touch within the display area. As described below, user interface 24 provides a data protection signal and, in some cases, a data restore signal to VCS 20 upon receiving predetermined input(s) via touchscreen 30. It should be noted that user interface 24 may also be realized utilizing a keypad, touchpad, keyboard mouse, touchscreen, joystick, microphone, button, or another suitable device adapted to receive input from the user.

Port 32 may comprise a Universal Serial Bus (USB) port, a memory card reader, or other data interface. Port 32 may be configured to receive a USB flash drive, a flash memory card, or other portable memory source. User interface 24 and VCS 20 may be cooperatively configured to enable a user to store predetermined data on, and retrieve predetermined data from, a portable memory device that is removably coupled to port 32. It should be understood that user interface 24 may also store and/or retrieve data related to other vehicle control units or systems from the portable memory device via port 32. For example, the portable memory device may be configured to store audio data for use by a digital audio playback system, diagnostic information generated by a vehicle control unit or system, and/or software programs or updates for a specific vehicle control unit or system.

Wireless data interface 22 is configured to communicate with one or more key fobs (or other remote vehicular access devices). Wireless data interface 22 receives signals from the key fob and, in response, causes vehicle 10 to perform a predetermined action (e.g., lock/unlock the vehicle doors, activate/deactivate a vehicle alarm system, start/turnoff the engine, etc.) In addition, wireless data interface 22 transmits a data protection signal and, in some embodiments, a data restore signal to VCS 20 upon receiving predetermined signals from a key fob. Finally, in some embodiments wireless data interface 22 is cooperatively configured with VCS 20 to establish a secure wireless connection with a key fob for the purposes of transmitting predetermined data to the key fob and receiving predetermined data from the key fob.

As depicted, wireless data interface 22 includes a processor 34, memory 35, a transceiver 36, and a wireless antenna 38. As used herein, the term "processor" may refer to a programmable logic control system (PLC), a microprocessor, or any other type of electronic controller. Further, a "processor" may include one or more components of a digital and/or analog type and may be programmable by software and/or firmware. Processor 34 is configured to receive signals from the key fob and to transmit corresponding signals to the appropriate vehicle control unit or system. Further, in some embodiments processor 34 is configured to establish a secure wireless connection with a key fob using a wireless communication protocol such as BLUETOOTH® or IEEE 802.11 (any applicable variant). Memory 35 is configured to store instructions in any format, including source or object code, and/or data. Finally, transceiver 36 is configured to transmit signals to, and receive signals from, a key fob via wireless antenna 38. Although the illustrated embodiment depicts a wireless data interface 22 as a single module, it should be understood that in some embodiments the functionality of wireless data interface 22 may be distributed across multiple vehicle control units or modules.

VCS 20 may be configured to perform a plurality of functions requiring access to private data corresponding to a user of vehicle 10. For example, VCS 20 may provide the user with names, addresses, phone numbers, and/or other information that is stored in a contact list via user interface 24. Further, VCS 20 may provide the user with navigational instructions for driving a vehicle 10 to the user's home address or an address stored in a contact list. In addition, VCS 20 may be configured to establish secure connections with a plurality of remote devices (e.g., network servers, personal computers, laptops, cell phones, PDAs) to communicate regarding the status of vehicle 10, acquire updated navigational and mapping data for vehicle 10, or to pay fees (e.g., toll fees) and other expenses in response to input from the user. These secure connections may require VCS 20 to access predetermined cryptographic keys and/or passphrases.

As further described below, VCS 20 may access private data stored in memory during normal operation of vehicle 10. However, upon receiving a data protection signal VCS 20 is configured to protect the private data to prevent it from being accessed by an unauthorized party that has control of vehicle 10 and/or VCS 20. Further, in some embodiments VCS 20 is configured to restore the private data upon receiving a data restore signal, enabling VCS 20 to access the private data again.

In the illustrated embodiment, the VCS 20 includes a processor 40, memory 42, and a wireless network interface 44. Processor 40 is configured to selectively retrieve private data from a stored location during normal operation of vehicle 10. Further, processor 40 is configured to protect the private data upon receiving a data protection signal and, in some embodiments, to restore the private data upon receiving a data restore signal.

As used herein the term "memory" may refer to random access memory, read-only memory, flash memory and other types of electronic and/or non-electronic memory. Memory 42 may be coupled to processor 40, enabling processor 40 to write to, and read from memory 32. Alternatively, memory 42 may be formed integrally with processor 40. Memory 42 is configured to stored instructions and/or data, including private data, in any format including source code or object code.

Wireless network interface 44 is coupled to a wireless antenna 46 and enables wireless communications between the VCS 20 and an electronic network via a wireless network access point. For example, in one embodiment wireless network interface 44 includes a short range wireless communication device that communicates with a wireless router or other short range network communication device. Further, wireless network interface 44 may include a cellular modem that is coupled to a cellular phone. In this case, the cellular phone connects the wireless modem to an Internet Service Provided (ISP) modem or other telephonic network access point. It should be noted that in other embodiments, other wireless communication technologies (including satellite) may also be used.

Although the illustrated embodiment depicts a VCS 20, it will be understood by one who is skilled in the art that other embodiments of the present invention may utilize other vehicle control units or modules that are configured to access and store private data. Further, it should be understood that in some embodiments, vehicle 10 may have the functionality of processor 40, memory 42, and wireless network interface 44 distributed across more than one module of vehicle 10.

FIG. 2 depicts a block diagram of an exemplary system 100 for protecting private data stored on a vehicle. System 100 includes the vehicle 102, a key fob 104, and a portable memory device 106. Vehicle 102 is substantially the same as vehicle 10 (FIG. 1) described above. Thus, vehicle 102 includes a VCS 110 that is coupled to one or more sensors 111, a wireless data interface 112 and a user interface 114 via an online data communication bus 116. VCS 110 includes a processor 120, memory 122, a wireless network interface 124, and a wireless antenna 126. Wireless data interface 112 includes a processor 130, memory 132, a transceiver 134, and a wireless antenna 136. Finally, user interface 114 comprises a touchscreen 140 and a port 142.

Portable memory device 106 is an external memory source that may be removably coupled to port 142 and then extracted by a user of vehicle 102. As described above, portable memory device 106 may comprise a USB flash drive, a flash memory card, or another portable memory source. Portable memory device 106 includes memory 144 that is configured to store predetermined data received from VCS 110 and provide the predetermined data to VCS 110 when portable memory device 106 is coupled to port 142.

Key fob 104 may comprise any remote vehicular access device configured to transmit signals to or to communicate with wireless data interface 112. For example, key fob 104 may be configured to transmit signals to wireless data interface 112 to cause vehicle 102 to perform a predetermined action (e.g., lock/unlock the vehicle doors, activate/deactivate a vehicle alarm system, start/stop the engine, etc.). As further described below, upon receiving predetermined signals from key fob 104, wireless data interface 112 provides a data protection signal or a data restore signal to VCS 110. In addition, in some embodiments, key fob 104 is configured to establish a secure wireless connection with wireless data interface 112. VCS 110 transmits predetermined data to key fob 104 and receives predetermined data from key fob 104 via the secure wireless connection. Key fob 104 may be formed integrally with a key for vehicle 102, be coupled to a key chain corresponding to vehicle 102, or it may comprise a standalone remote vehicular access device in the case where vehicle 102 is configured for keyless operation.

In one embodiment, key fob 104 includes a processor 150, memory 152, a keypad 154, a wireless transceiver 156, a wireless antenna 158, and a battery 160 to provide the electrical power for key fob 104. Processor 150 is configured to transmit the signals described above to wireless data interface 112 in response to inputs received from a user via keypad 154. Further, in some embodiments processor 150 is configured to establish a secure wireless connection with wireless data interface 112. Memory 152 is configured to store instructions in any form, including source code and object code, and/or data, including the predetermined data. Thus, key fob 104 is also an external memory source for vehicle 102. Finally, transceiver 156 transmits signals to, and receives signals from, wireless data interface 112 via wireless antenna 158.

Returning to VCS 110, processor 120 is configured to protect private data stored in memory 122 upon receiving a data protection signal. Processor 120 protects the private data by deleting predetermined data from memory 122. As described below, deleting the predetermined data from memory 122 prevents processor 120 from accessing the private data. In some embodiments, the predetermined data comprises the private data itself. Alternatively, the predetermined data may comprise a cryptographic key that is used to encrypt the private data. Further, in some embodiments processor 120 is configured to store the predetermined data on an external memory source (e.g., key fob 104 or portable memory device 106), enabling processor 120 to retrieve the predetermined data and restore the private data upon receiving a restore private data signal.

In a first embodiment, processor 120 deletes the private data from memory 122 response to a data protection signal. In this case, a user may generate the data protection signal by interacting with user interface 114 (e.g., by selecting an icon or menu item and entering a predetermined passphrase on touchscreen 140) or actuating a button on key fob 104. Upon receiving the data protection signal processor 120 deletes all private data from memory 122. It should be understood, that this first embodiment permanently removes the private data from VCS 110 and, therefore, may be suited for situations in which the owner is selling vehicle 102, replacing VCS 110, or performing another action that will permanently remove VCS 110 from the control of the owner.

In a second embodiment, processor 120 stores the private data on an external memory source (e.g., key fob 104 or portable memory device 106) before deleting the private data from memory 122. In this case, the user may generate a data protection signal via user interface 114 by selecting an icon or menu item an entering a passphrase on touchscreen 140 or by performing another operation that requires the data to be protected, such as placing the vehicle in a mode (e.g., a valet mode) in which certain features on the vehicle are restricted. Further, in this second embodiment the user may also generate the data protection signal by actuating a button on key pad 154 or by performing some other action with respect to vehicle 102, such as removing the key in the vehicle ignition or turning the vehicle ignition to the off position.

In this second embodiment, processor 120 transmits the private data from memory 122 to an external memory source (e.g., key fob 104 or portable memory device 106) and then deletes the private data from memory 122 upon receiving the data protection signal. For example, if portable memory device 106 is coupled to port 142, processor 120 may store the private data in memory 144 for portable memory device 106. Alternatively, processor 120 may instruct wireless data interface 112 to establish a secure wireless connection with key fob 104. Processor 120 may than transmit the private data to key fob 104, via the secure wireless connection, to be stored in memory 152. After the private data is stored on the external memory source processor 120 deletes the private data from memory 122.

This second embodiment enables a user to restore the private data to vehicle 102 by generating a data restore signal. The user may generate the data restore signal by interacting with user interface 114 to restore the data or perform another action (e.g., removing vehicle 102 from a valet mode) that involves restoring the private data. Further, the data restore signal my be generated when the user actuates a button on keypad 154 of key fob 104 or performs some other action with respect to vehicle 102, such as inserting the key into the vehicle ignition or turning the vehicle ignition to the on position.

Upon receiving the data restore signal, processor 120 retrieves the private data from the external memory source (e.g., key fob 104 or portable memory device 106) and store the private data in memory 122. For example, if the private data is stored on portable memory device 106 coupled to port 142, processor 120 may retrieve the private data from memory 144. Further, if the private data is stored in memory 152 on key fob 104, processor 120 may instruct wireless data interface 112 to establish a secure wireless connection with key fob 104. Processor 120 may then communicate with key fob 104 to retrieve the private data that is stored in memory 152. Processor 120 stores all of the retrieved private data in memory 122 enabling the user to access it.

In a third embodiment, processor 120 is configured to encrypt the private data with a cryptographic key and then delete the cryptographic key from memory 122. Processor 120 may utilize a predetermined cryptographic key or it may generate the cryptographic key. In this third embodiment, the user may generate the data protection signal using any of the methods described above with regard to the second embodiment.

Upon receiving the data protection signal, processor 120 encrypts all the private data that is stored in memory 122 with a cryptographic key. Processor 120 then provides the cryptographic key to the user. Processor 120 may utilize user interface 114 to provide the user with the cryptographic key. For example, processor 120 may cause touchscreen 140 to display the cryptographic key to the user. Alternatively, processor 120 may store the cryptographic key on an external memory source. For example, processor 120 may store the cryptographic key on portable memory device 106 via data port 142. Further, processor 120 may instruct wireless data interface 112 to establish a secure wireless connection with key fob 104 for the purpose of transmitting the cryptographic key to key fob 104 to be stored in memory 152.

After the private data is encrypted and the cryptographic key is provided to the user, processor 120 deletes the cryptographic key and any unencrypted private data from memory 122. The encrypted private data remains on vehicle 102, but is not accessible without the cryptographic key.

This third embodiment also enables the user to restore the private data at a later time by generating a data restore signal. The user may utilize any of the methods described above with regard to the second embodiment to generate the data restore signal. Upon receiving the data restore signal, processor 120 retrieves the cryptographic key and decrypts the encrypted private data, or a portion of the encrypted private data, that is stored in memory 122.

Processor 120 may retrieve the cryptographic key from the user via user interface 114. For example, touchscreen 140 may provide a graphical user interface to enable the user to enter the cryptographic key. Alternatively, processor 120 may retrieve the cryptographic key from an external memory source where it is stored. For example, if the cryptographic key is stored in memory 144 for portable memory device 106, processor 120 may retrieve the cryptographic key via port 142. Further, if the cryptographic key is stored in memory 152 of key fob 104, processor 120 may instruct wireless data interface 112 to establish a secure connection with key fob 104. Processor 120 may then communicate with key fob 104 to retrieve the stored cryptographic key.

During a fourth embodiment, processor 120 stores the private data on an external memory source (e.g., key fob 104 or portable memory device 106) during normal operation of vehicle 102. Thus, processor 120 accesses the key fob 104 (via a secure connection between key fob 104 and wireless data interface 112) or the portable memory device 106 (via port 142) each time that processor 120 requires access to the private data. In addition, in this fourth embodiment processor 120 may be configured to store a cached copy of the private data, or portions of the private data, in memory 122. For example, if there are portions of the private data that processor 120 needs to access frequently, it may store those portions in memory 122 to decrease access time.

In this fourth embodiment, when a user generates a data protection signal (e.g., using any of the methods described above with regard to the second embodiment) the private data remains stored on the external memory source and processor 120 deletes any cached copy of the private data from memory 122. There is no need to restore the private data in this embodiment because processor 120 may retrieve it as needed if the external memory device is available the next time the vehicle is operated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for protecting data stored on a vehicle, the method comprising:
   storing predetermined data on a vehicle memory onboard the vehicle;
   receiving a first signal representative of an action of a user of the vehicle; and
   in response to the first signal, storing the predetermined data on a key fob device and subsequently deleting the predetermined data from the vehicle memory onboard the vehicle to prevent the predetermined data from being accessed on the vehicle,
wherein the predetermined data comprises a cryptographic key and the method further comprises:
   encrypting private data with the cryptographic key;
   wherein:
      the step of storing the predetermined data comprises storing the cryptographic key on the vehicle memory onboard the vehicle; and
      the step of storing the predetermined data on the key fob device and subsequently deleting the predetermined data from the vehicle memory comprises:
         in response to the first signal, storing the cryptographic key on the key fob device and subsequently deleting the cryptographic key from the vehicle memory onboard the vehicle.

2. The method of claim 1, wherein the data interface further comprises a wireless data interface for establishing a secure wireless connection with the key fob device and the step of storing further comprises:
   establishing a first secure wireless connection between the wireless data interface and the key fob device; and
   transmitting the predetermined data to the key fob device via the first secure wireless connection.

3. The method of claim 2, further comprising:
receiving a second signal representative of a second action of the user of the vehicle; and
in response to the second signal:
establishing a second secure wireless connection between the wireless data interface and the key fob device, wherein the second wireless connection is different from the first wireless connection; and
retrieving the predetermined data from the key fob device to the vehicle memory onboard the vehicle via the second secure wireless connection.

4. The method of claim 1, wherein the first signal pertains to an entry or exit of the user of the vehicle, and the step of storing the predetermined data on the key fob device and subsequently deleting the predetermined data from the vehicle memory comprises:
in response to the entry or exit of the vehicle by the user of the vehicle, storing the predetermined data on the key fob device and subsequently deleting the predetermined data from the vehicle memory onboard the vehicle.

5. The method of claim 1, wherein the first signal pertains to a locking or unlocking of a door of the vehicle, and the step of storing the predetermined data on the key fob device and subsequently deleting the predetermined data from the vehicle memory comprises:
in response to the locking or unlocking of the door of the vehicle, storing the predetermined data on the key fob device and subsequently deleting the predetermined data from the vehicle memory onboard the vehicle.

6. The method of claim 1, wherein the first signal pertains to a turning off of an ignition of the vehicle, and the step of storing the predetermined data on the key fob device and subsequently deleting the predetermined data from the vehicle memory comprises:
in response to the turning off of the ignition of the vehicle, storing the predetermined data on the key fob device and subsequently deleting the predetermined data from the vehicle memory onboard the vehicle.

7. The method of claim 6, further comprising:
in response to a turning on of the ignition of the vehicle subsequent to the turning off of the ignition of the vehicle, transmitting the predetermined data from the key fob device to the vehicle memory onboard the vehicle.

8. A system for protecting data that is stored on a vehicle, the system comprising:
a key fob device configured to store data;
a data interface configured to transmit data to, and retrieve data from, the key fob device;
a vehicle memory onboard the vehicle, the vehicle memory configured to store predetermined data; and
a processor coupled to the data interface and configured to:
receive a signal representative of an action of a user of the vehicle; and
in response to the received signal:
transmit the predetermined data stored on the vehicle memory onboard the vehicle to the key fob device for storage on the key fob device after receiving the signal; and
delete the predetermined data from the vehicle memory onboard the vehicle after transmitting the predetermined data to the key fob, wherein the predetermined data comprises a cryptographic key and the processor is further configured to:
encrypt private data with the cryptographic key;
facilitate storing the cryptographic key on the vehicle memory onboard the vehicle; and
in response to the first signal, store the cryptographic key on the key fob device and subsequently delete the cryptographic key from the vehicle memory onboard the vehicle.

9. The system of claim 8, wherein:
the processor is further configured to:
transmit the predetermined data to the key fob via a first secure wireless connection upon receiving the signal; and
upon receiving a second signal that is different from the signal, the second signal representative of a second action of the user of the vehicle, retrieve the predetermined data from the key fob to the vehicle memory onboard the vehicle via a second secure wireless connection that is different from the first wireless connection.

10. The system of claim 8, wherein the signal pertains to an entry or exit of the user of the vehicle, and the processor is configured to:
in response to the entry or exit of the user of the user of the vehicle:
transmit the predetermined data stored on the vehicle memory onboard the vehicle to the key fob device for storage on the key fob device after receiving the signal; and
delete the predetermined data from the vehicle memory onboard the vehicle after transmitting the predetermined data to the key fob.

11. The system of claim 8, wherein the signal pertains to a locking or unlocking of a door of the vehicle, and the processor is configured to:
in response to the locking or unlocking of the door of the vehicle:
transmit the predetermined data stored on the vehicle memory onboard the vehicle to the key fob device for storage on the key fob device after receiving the signal; and
delete the predetermined data from the vehicle memory onboard the vehicle after transmitting the predetermined data to the key fob.

12. The system of claim 8, wherein the processor is further configured to:
receive a second signal representative of an action by the user; and
in response to the second signal, retrieve the predetermined data from the key fob device to the vehicle memory onboard the vehicle after receiving the second signal.

13. A system for protecting private data that is accessed by a vehicle, the system comprising:
a key fob device;
a data interface configured to store the private data on, and retrieve the private data from, an external memory source; and
a processor coupled to the data interface and configured to:
selectively retrieve the private data from the external memory source;
selectively update the private data that is stored on the external memory source;
receiving a signal in response to an exit or entry of the vehicle by a user of the vehicle; and
delete any cached copies of the private data stored on the vehicle in response to the signal generated in response to the exit or entry of the vehicle by the user of the vehicle.

14. The system of claim 13, wherein:
the data interface comprises a wireless data interface for establishing a secure wireless connection with a remote vehicular access device configured to store the private data; and
the processor is further configured to:
selectively retrieve the private data from the remote vehicular access device via the secure wireless connection; and
selectively update the private data on the remote vehicular access device via the secure wireless connection.

15. The system of claim 13, wherein the key fob device comprises the external memory source on which the private data is stored.

16. The system of claim 13, wherein:
the key fob device is configured to transmit a signal to lock or unlock a door of the vehicle; and
the processor is configured to delete any cached copies of the private data stored on the vehicle in response to the signal to lock or unlock the door.

17. The system of claim 13, wherein:
the key fob device is configured to transmit a signal to activate or deactivate an alarm system of the vehicle; and
the processor is configured to delete any cached copies of the private data stored on the vehicle in response to the signal to activate or deactivate an alarm system.

18. The system of claim 13, wherein:
the key fob device is configured to transmit a signal to turn on or off an engine of the vehicle; and
the processor is configured to delete any cached copies of the private data stored on the vehicle in response to the signal to turn on or off the engine.

* * * * *